April 23, 1940.　　　O. P. M. GOSS ET AL　　　2,198,245
METHOD OF MANUFACTURING LUMBER
Filed Aug. 2, 1937　　　2 Sheets-Sheet 2
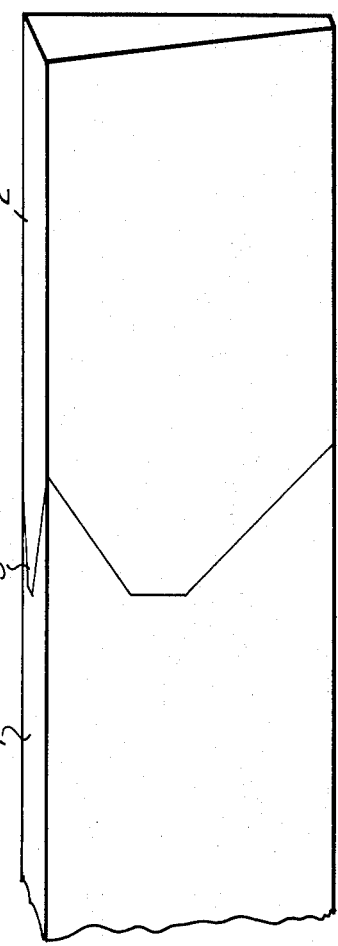
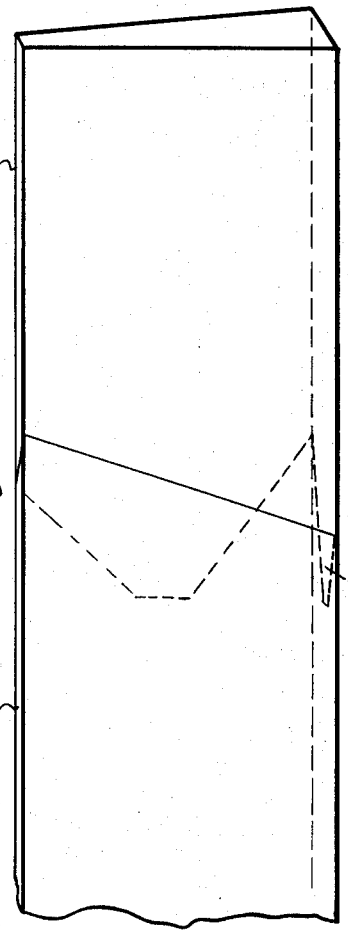
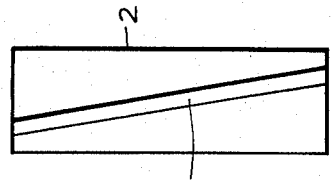
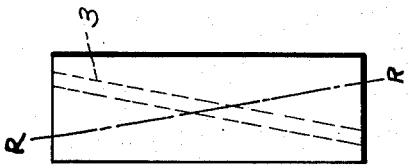
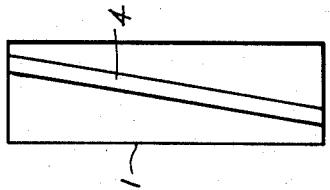
INVENTOR
OLIVER P. M. GOSS
BY WORTH C. GOSS
Cook & Robinson
ATTORNEY Patented Apr. 23, 1940

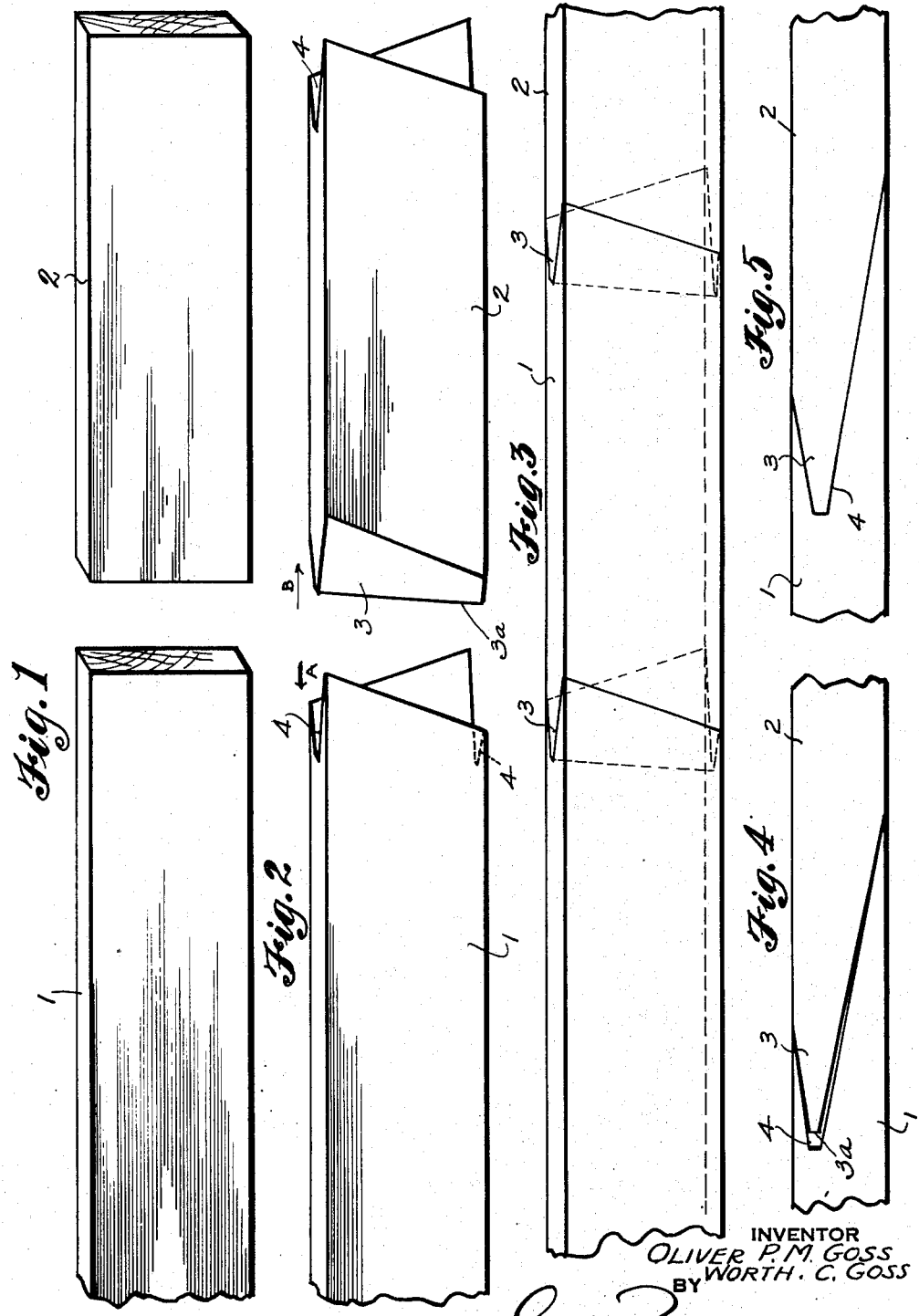

2,198,245

UNITED STATES PATENT OFFICE 2,198,245

METHOD OF MANUFACTURING LUMBER

Oliver P. M. Goss and Worth C. Goss, Seattle, Wash.

Application August 2, 1937, Serial No. 156,864

3 Claims. (Cl. 144—309)

This invention relates to lumber and to a method of making lumber. More particularly, the invention relates to the fabricating of wood pieces, trimmings, and the like, which ordinarily are disposed of as waste material in the lumber mill, into boards from which beveled siding lumber of commercial lengths can be manufactured.

It is the principal object of this invention to provide a method of preparing and joining together the short board pieces to provide sound boards of a practical length for the manufacture of beveled siding therefrom; it being understood that this method contemplates following the method now generally in use insofar as it concerns the resawing of boards on a line that is angularly inclined with reference to the planes of the opposite side faces of the boards, thus to form two pieces of beveled siding material.

It is also an object of the invention to provide a novel connecting joint for the board pieces, whereby, upon resawing the fabricated boards lengthwise on a beveled cut, the connecting joints will not be impaired and two identical beveled siding boards will be formed, each with the pieces thereof solidly and permanently united.

A special feature of the invention resides in the particular way in which the ends of the board pieces are prepared to form dovetail connecting joints that are inclined toward the diagonal of the joined pieces so that in the resawing of the boards thus formed, lengthwise of and on a diagonal line opposite to and crossing the diagonal line of the dovetailed joints, the joined pieces of each siding board will, at the base edges of the siding boards, be connected by dovetail joints.

Still another object of the invention resides in the product that is formed by the present method.

Other objects reside in the various steps of the method and in their sequence whereby to produce beveled siding, and in the details of construction of the finished product.

In accomplishing these objects of the invention, we have provided the improved method and details of construction, the preferred forms of which are illustrated in the accompanying drawings, wherein—

Fig. 1 is a perspective view of two short wood pieces prior to their being joined to form a board for the manufacture of beveled siding therefrom.

Fig. 2 is a view showing the tongue and groove forming operations on the pieces preparatory to joining them together.

Fig. 3 is a view of the prepared pieces after being joined together according to this invention.

Fig. 4 is a detail, showing the joint as formed by pieces brought together and before pressure has been applied to seat the tongue in the groove and illustrating the difference in the angle of the side surfaces of the tongues and of the grooves to insure tightness of the joint when the parts are pressed together.

Fig. 5 is a similar edge view of the board with the joint closed by end pressure.

Fig. 6 is an end view of a board piece formed with a groove, as seen when looking in the direction of arrow A in Fig. 2.

Fig. 7 is an end view of a wood piece formed with a tongue as seen when looking in the direction of arrow B in Fig. 2.

Fig. 8 is an end view of a board, illustrating the diagonal or angular direction of the tongue and groove joint and the angular line of resawing crossing the joint whereby to form the two pieces of beveled siding from the board, each with a dovetailed joint in the base edge of the piece.

Figs. 9 and 10 show, in perspective, two pieces of siding formed from a board and particularly illustrating the joints whereby the pieces are connected.

Referring more in detail to the drawings—

The present invention contemplates the use of short lengths of material which may be either waste, or trimmings in the saw mill, and which, as such, are not generally suitable for use as commercial lumber. While the kind of wood used in the manufacture of the present siding is of no particular consequence, the invention is well adapted to the making of siding from cedar or pine pieces; it being contemplated, in accordance with the present method, that the short pieces shall be prepared at their ends for joining, then joined by end pressure after an application of glue, the board then surfaced and finally resawed to form two pieces of beveled siding therefrom.

It will here be stated that it is now common practice to make beveled siding from boards, for example, one inch thick and six inches wide, by sawing the boards lengthwise into two pieces along a line that is inclined with reference to the opposite sides of the board, so as to form the two pieces of beveled siding. The present method contemplates resawing the boards in this same way, but after they have been made up by the joined short lengths of material.

In Fig. 1 of the drawings, we have shown board pieces 1 and 2 prior to their being joined together, and in Fig. 2, these same pieces are illustrated as having been prepared for joining. The preparation of the pieces comprises forming each piece at one end with a tongue 3, and, at its other end, with a groove 4. The tongues are of wedge shape, as seen best in Figs. 4 and 5, and are of substantial taper and formed with square cut end surfaces 3a. The opposite side surfaces of the tongues are flat and converge in symmetrical angles with reference to the sides of the board to form a rather elongated tongue, and the square cut end edge of the tongue extends along a line that is inclined with reference to the planes of the opposite side surfaces of the piece, as will be best understood by reference to Fig. 7, which shows the tongue inclined so that at the top edge of the board it is quite close to one side, and at the bottom edge, it is quite close to the other face. Thus the tongue is inclined toward the diagonal line of the piece. The grooves are likewise inclined toward the diagonal in the ends of the boards so that when a tongue on the end of one piece is fitted into a groove in the end of another piece, the side surfaces of the two board pieces will be flush and in alignment.

In order that the dovetail joint thus formed may be made tight, it is preferred that the tongue be slightly less tapered than the side walls of the groove, so that, when brought together without pressure, the joint will be left slightly open at the base of the groove, as seen in Fig. 4, and providing that end pressure must be brought against the pieces to seat the tongue in the groove, as in Fig. 5, and that this seating of the tongue will cause a slight outward springing of the portions of the joint at opposite sides of the groove and these will maintain an inward pressure against the tongue. Prior to seating the tongue in the groove, glue of a suitable character is applied to the surfaces so that the parts will be permanently secured together upon the setting of the glue.

After the pieces have been joined together, the boards are surfaced in the usual manner by passing them through planers, which leaves their opposite sides and edge surfaces perfectly smooth. Then, upon resawing, the lumber is in condition for commercial use.

Assuming that board pieces of the character shown in Fig. 1 are provided at their ends with the tongues and grooves, as described, and that they are then joined together to form boards of practical length, these boards, which are rectangular in cross section, may then be passed through the resawing machines and split lengthwise, each along a line as designated by the line R—R in Fig. 9. Since this line of the resaw is inclined at the same angle, but opposite to the inclination of the tongue and groove joints so that they cross each other as noted in Fig. 8, it is apparent that the resawing will thus form the two pieces of beveled siding of exactly the same size, and it provides that the base, or wider edge of each piece of siding, will contain the dovetail connections. The top edges of the siding boards will contain the lap joint connections. However, since this narrow edge, in use of the lumber, is always nailed beneath the lower edge of the next higher board, there is not any necessity for a dovetail connection.

Siding of various widths and thicknesses may be formed in the same way as above described by the use of board pieces of different widths and thicknesses.

It is desired here to point out that applicant is making no claim to the manufacture of beveled siding by resawing boards of rectangular cross section, nor is he seeking any claim on the fabrication, but the present invention is based upon the resawing as described, of boards which are formed from pieces of material joined together by tongue and groove joints which are inclined with reference to the surface of the board and opposite in inclination to the resaw cut so that when the two bevel siding pieces are formed, the various pieces will have dovetail connections in the base edges of the boards.

The present method provides for the economical manufacture of bevel siding from what are ordinarily waste pieces of material, and by reason of the character of the joint, the relationship of the resaw cut, and the gluing of the pieces together, provides a product that is satisfactory in every respect and compares favorably with what is known as first grade long length lumber.

In order that there may be a better understanding of what it is intended to claim as new in this invention, it will be here stated that the term "resawing" or "resawed" has reference to the sawing of a board lengthwise whereby to divide or split it into two boards having the same length and width as the original piece. Resawing is a common practice in the manufacture of lumber, and usually, but not necessarily provides for the dividing of a board into two pieces of the same dimensions. In the present instance, ordinarily, the beveled siding pieces formed from the board would be of the same dimensions throughout.

Having thus described our invention, what we claim as new therein and desire to secure by Letters Patent is—

1. A method of manufacturing beveled siding and the like, comprising forming a board of substantially uniform dimensions throughout its length by joining a plurality of board pieces in end to end connection by tongue and groove joints that extend through from edge to edge of the board at an inclination with reference to the opposite side surfaces of the board, then resawing the fabricated board by a longitudinal cut, from edge to edge of the board and at an inclination opposite that of the joints, and passing through the joints.

2. A method of manufacturing beveled siding and the like, comprising forming a board of substantially uniform dimensions throughout its length by joining a plurality of board pieces in end to end connection by tongue and groove joints that extend from edge to edge of the board and symmetrically spaced from, and diagonally inclined relative to its opposite sides, then resawing the fabricated board by a longitudinal cut, from edge to edge of the board, and diagonally inclined opposite to the inclination of the joints and passing through the joints medial of the edges of the board.

3. The method of manufacturing beveled siding comprising providing the ends of board pieces of the same width and thickness respectively with tapered tongues and tapered grooves of the full thickness of the pieces and extending from edge to edge thereof, joining the pieces in end to end connection by interfitting the tongues and grooves, then resawing the fabricated board diagonally from edge to edge to form two pieces of beveled siding by a longitudinal cut passing diagonally through the board from edge to edge and through the joints medial of the edges of the board.

OLIVER P. M. GOSS.
WORTH C. GOSS.